Patented Aug. 14, 1951

2,563,872

UNITED STATES PATENT OFFICE 2,563,872

UNSATURATED MONOHYDRIC PHENOLIC ETHER-MODIFIED ROSIN ESTERS AND PROCESS OF MAKING SAME

John B. Rust, East Hanover, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application November 12, 1947, Serial No. 785,544

10 Claims. (Cl. 260—24)

1

The present invention relates to new modified rosin esters and to the process for the preparation of the same. More particularly, it relates to the reaction products of rosin or rosin-containing esters with unsaturated polymerizable monohydric phenolic compounds having from 2 to 4 beta-unsaturated aliphatic groups of from 3 to 4 carbon atoms. Such unsaturated, polymerizable phenolic compounds are exemplified by allyl allylphenyl ethers and allyl allylphenoxy esters, and may be represented by the general formula:

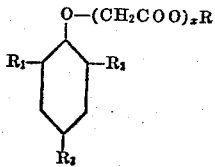

where R and $R_1$ are beta-unsaturated aliphatic hydrocarbon radicals having from 3 to 4 carbon atoms, $R_2$ and $R_3$ are hydrogen, lower alkyl or beta-unsaturated radicals of the type R and $R_1$, and $x$ is a number equal to 0 or 1.

These unsaturated phenolic ethers and aromatic oxymethyl carboxylates may be obtained as high-boiling liquids in a substantially pure state, as they are capable of being distilled under reduced pressure without undue polymerization. They appear to be slow to polymerize in the presence of peroxides or metallic driers. However, high temperatures, particularly in the presence of minute quantities of mineral acids such as hydrogen chloride, sulphuric acid, phosphoric acid, paratoluenesulphonic acid and the like, or such anhydrous metallic salts as stannic chloride, aluminum chloride, boron trifluoride, and the like, readily convert them into infusible insoluble masses which are highly resistant to the action of aqueous alkalies. When these unsaturated phenolic compounds are polymerized in the presence of the above mentioned catalysts, characteristic red to dark brown color-bodies are formed which give rise to the production of characteristically dark products. On the other hand, when they are combined with rosin or rosin esters, reaction is fairly rapid and unexpectedly light-colored, hard, brittle resins are obtained which when saponified are completely soluble in water. When the latter aqueous solutions are acidified and the hydrolytic product washed and dried, the acids from these modified rosin products possess acid numbers of 100–180 depending upon the amount of unsaturated phenolic compound employed.

2

These modified rosin-containing esters are light-colored, hard, brittle resins of low acid numbers.

Thus, the following objects of the present invention are apparent:

(1) To provide a soluble, modified rosin-containing ester which will be heat-advancing in drying oil-varnish formulations.

(2) To provide a soluble, modified rosin-containing ester which upon cooking with drying oils such as linseed oil, soya bean oil, and the like will form fast drying, alkali resistant coatings.

(3) To provide a soluble, modified rosin-containing ester which will increase the speed of body and the subsequent speed of drying of the so-called slow drying oils such as linseed oil, soya bean oil, and the like.

(4) To provide a soluble, modified rosin-containing ester which, in combination with linseed oil, will be non-yellowing in baked coatings.

Other objects of the present invention will become apparent from the more detailed description set forth below.

These objects are attained by heating the unsaturated phenolic compound with abietic acid radical-containing material such as rosin, a rosin ester (particularly a polyhydric alcohol ester), a rosin-modified alkyd resin, a mixture of rosin and a polyhydric alcohol (e. g., glycerol, pentaerythritol, etc.) in stoichiometrical proportions to form an ester, or a mixture of rosin, a polyhydric alcohol and a polycarboxylic acid (e. g., phthalic, succinic, adipic, sebacic, etc.) in stoichiometrical proportions to form a rosin-modified alkyd resin. The rosin material and the unsaturated phenolic compound are heated together in a suitable reactor at a temperature of 200°–300° C. until the reaction is substantially complete as shown by no more refluxing of the unsaturated phenolic compound. Heating is then continued until the resulting resin reaches the desired hardness. In practice, an inert atmosphere of carbon dioxide or nitrogen may be employed to prevent any oxidation of the resin, although its use is not essential. Neither is it necessary to employ the catalysts previously mentioned in the reaction, since combination takes place in the presence of heat alone as already described. The resulting resins are clear, hard, and brittle, and exceedingly pale in color. The resins prepared from rosin esters or rosin ester-forming mixtures possess acid numbers of 2 to 12.

The products of the present invention may be blended with nitrocellulose to form lacquers which show a surprisingly rapid rate of solvent release. These resins when modified with drying oils, particularly the so-called soft drying oils such as linseed oil or soya bean oil, provide exceedingly fast-drying coating compositions which possess an excellent resistance to dilute aqueous alkali. They may also be combined with styrene, acrylic acid esters, methacrylic acid esters, acrylonitrile, and the like to obtain products useful to those skilled in the art.

In practicing the process of the present invention, as little as 1% and as much as 50% of the unsaturated phenolic product (based on the rosin or rosin ester) may be employed. However, proportions of 10% to 30% of the unsaturated phenolic compound are to be preferred, since these proportions impart the desired degree of modification to the rosin or rosin esters. The higher proportions of unsaturated phenolic compound give resins which possess higher softening points and impart a better alkali resistance to the varnish formulations in which the resins are employed.

We do not wish to limit ourselves to any theoretical explanation of the reaction, although it is probable that the reaction involved is one of addition. It is presumably an addition of the unsaturated allyl groups (or other unsaturated hydrocarbon groups) of the phenolic ether to the unsaturated abietic radical of the rosin, since initally the resins prepared from rosin and the unsaturated phenolic ether are completely alkali-soluble.

It is possible to employ polycarboxylic acid-modified rosin esters in place of rosin or the polyhydric alcohol-rosin esters. Also, as noted above it is within the scope of the present invention to provide modified rosin esters wherein rosin, polyhydric alcohol and unsaturated phenolic product, or rosin, polyhydric alcohol, polycarboxylic acid and unsaturated phenolic compound, are reacted together simultaneously.

There are, of course, numerous unsaturated phenolic compounds of the type employed in the practice of the present invention. For the purpose of illustration these include the unsaturated alkyl ethers of phenols of the type:

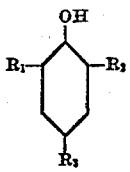

wherein $R_1$ is a beta-unsaturated aliphatic radical such as allyl, methallyl or crotyl, and $R_2$ and $R_3$ are hydrogen, a lower alkyl radical or a radical of type $R_1$. Saturated hydrocarbon radicals may also be present in the meta positions, and in any case the presence of such a group results from the phenol used as starting material (cresol, xylenol, tert-butylphenol, etc.) for making the unsaturated derivative.

The ethers are made in known manner by reacting the above monohydric phenols with an unsaturated halide such as allyl chloride or bromide, methallyl chloride, 3-chloro-1-butene, or crotyl chloride, and the ether-esters are advantageously made by reacting the phenol in the presence of alkali with a monohalogenated acetic acid (preferably chloroacetic acid on account of its ease of reaction and availability) and then esterifying the aryl-substituted acid with an unsaturated alcohol such as allyl, methallyl, butenyl or crotyl.

Another type of reaction product can be obtained by heating the abietic radical-containing material (rosin or a rosin ester) with a free phenol containing more than one beta-unsaturated aliphatic group (e. g. diallylphenol or triallylphenol). However, such products are less satisfactory for fast drying coating compositions on account of the presence of a free phenol group.

While most of the following examples teach the use of the rosin ester of glycerol (ester gum), it is apparent that rosin esters such as pentaerythrityl tetraabietate, mannityl abietate, and the like may also be used. Within this classification may also be considered such natural gums as copal, gum elemi, sandarac, thus, and the like, since these natural resinous products also undergo the reactions herein described.

The following examples are given by way of illustration only, and should not be considered as limiting. All proportions are in parts by weight.

*Example 1*

100 parts of glyceryl tri-abietate (ester gum) and 25 parts of the allyl ether of allylphenol are placed in a ½-liter, 3-neck flask equipped with a thermometer, mechanical stirrer and water-cooled condenser. Heating is carried out slowly to 200° C. over a period of one hour, and thence from 200° C. to 250° C. over a period of 6 hours. When the rate of reflux of the allyl ether decreases, the temperature is held at 250° C. to 260° C. for an additional 4 hours. A light-colored clear resin is obtained of acid number 9 and ring and ball softening point of 94° C.

*Example 2*

100 parts of ester gum and 20 parts of the allyl ether of diallylphenol are placed in a ½-liter, 3-neck flask equipped with a thermometer, mechanical stirrer, and water-cooled condenser. Heating is slowly carried out to 200° C. over a period of one hour, and thence to 250° C. over a period of 6½ hours until the allyl ether has stopped refluxing. The temperature is held at 250° C. to 260° C. for an additional 5 hours. The resulting resin is light colored and has a ring and ball softening point of 105° C.

50 parts of the above resin and 80 parts of bodied linseed oil are heated together to 280° C. in ½ hour. Heating is carried out at 280°–290° C. for an additional 75 minutes to give a varnish base which can be drawn into a string 20 inches in length. The varnish base is thinned to 50% solids with V. M. and P. naphtha to which is added 0.01% cobalt as cobalt naphthenate based upon the oil content of the varnish. The varnish bakes to a hard non-yellowing film in 1 hour at 120° C. The baked film turns white in 1% aqueous alkali after immersion for 3½ hours.

*Example 3*

100 parts of ester gum and 20 parts of the allyl ether of triallylphenol are placed in a ½-liter, 3-neck flask equipped with a thermometer, mechanical stirrer, and water-cooled condenser. Heating is carried out slowly to 200° C. over a period of one hour, and thence from 200° C. to 250° C. over a period of 8 hours, at which time no further refluxing of the allyl ether is observed. The resulting modified rosin ester has an acid number of 7.2 and a ring and ball softening point of 102° C.

50 parts of the above resin and 80 parts of Z-2 bodied linseed oil are heated together to 280° C. in ½ hour. Heating is carried out at 280°–290° C. for 85 minutes to give a varnish base which can be drawn into a string 24 inches in length. The varnish base is thinned to 50% solids with V. M. and P. naphtha to which is added 0.5% lead and 0.075% cobalt as naphthenates based upon the drying oil content of the varnish. The varnish air dries to a tack-free film in 4¼ hours.

*Example 4*

100 parts of ester gum and 20 parts of the allyl ester of allyl phenoxy-acetic acid are heated together in a 500-ml., 3-neck flask equipped with a thermometer, stirrer, and water-cooled condenser. Heating is carried out at 200° C.–240° C. for 4 hours, and finally at 240°–250° C. for 4½ hours. The resulting resin shows an acid number of 9.8 and a ring and ball softening point of 113° C.

*Example 5*

100 parts of ester gum and 15 parts of the allyl ester of diallyl phenoxy-acetic acid are heated together in a 5-ml., 3 neck flask equipped with a thermometer, stirrer, and water-cooled condenser. Heating is carried out at 200° C.–240° C. for 4 hours and finally at 240° C.–250° C. for 6 hours. The resulting resin has an acid number of 11.3 and a ring and ball softening point of 109° C.

50 parts of the above resin and 80 parts of Z–2 bodied linseed oil are heated to 280° C. in ½ hour. Heating is thereafter continued at 280° C.–290° C. for 95 minutes. The resulting varnish base, after thinning with 130 parts of mineral spirits, possesses a viscosity (Gardner) of E. 0.010% of cobalt as cobalt naphthenate based on the drying oil content of the drier is added. The resulting varnish baked to a clear, light-colored film in ½ hour at 160° C. The baked film is unaffected after immersion in tap water for 24 hours.

*Example 6*

A mixture of 90 parts of WW rosin, 9.6 parts of glycerol, and 20 parts of the allyl ether of diallyl phenol is heated in a 500 ml., 3-neck flask equipped with a thermometer, stirrer and water-cooled condenser attached to a water-trap. Heating is carried out to 220° C. in one hour and thereafter at 220° C.–230° C. for 4 hours and finally at 260° C.–270° C. for 4 hours. A light-colored resin is produced having an acid number of 12.7 and a ring-and-ball softening point of 103° C.

Twenty-five parts of the above resin and 40 parts of Z–2 bodied linseed oil are heated together to 280° C. in 15 minutes and finally at 280° C.–290° C. for 67 minutes. The resulting varnish base could be drawn into a string 18″ in length. It is cooled to 150° C. and thinned with 65 parts of xylol. 0.015% cobalt as cobalt naphthenate (based upon the bodied linseed oil) are added. The varnish bakes to a hard clear film in ½ hour at 140° C. The baked film possesses a Sward Rocker hardness of 29 and turns cloudy in 1% aqueous alkali after 3¼ hrs. of immersion.

*Example 7*

Fifty parts of a rosin-modified phthalic glyceride of acid number 12 and 12.5 parts of the allyl ether of diallyl phenol are heated together in a 500 ml., 3-neck flask equipped with a thermometer, stirrer, and water-cooled condenser to 200° C. in one hour. Heating is continued at 230°–245° C. for 5¾ hours. A light-colored, brittle resin is obtained having a ring-and-ball softening point of 75° C.

It will be understood that it is intended to cover all changes and modifications of the examples of the invention herein chosen for the purpose of illustration which do not constitute departures from the spirit and scope of the invention.

We claim:

1. The resinous composition of claim 2 wherein the phenolic compound is the allyl ester of diallylphenoxyacetic acid.

2. A resinous composition comprising the reaction product at between 200° C. and 300° C. of (a) a natural gum component selected from the group consisting of rosin, copal, gum elemi, sandarac, thus, the polyhydric alcohol esters of said natural gums, and alkyd resins modified by said natural gums, with from 1% to 50% of (b) a monohydric phenolic compound containing from 2 to 4 beta-unsaturated olefinic radicals having from 3 to 4 carbon atoms, said phenolic compound being of the general formula

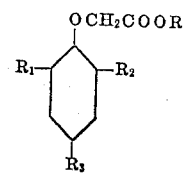

wherein R and $R_1$ represent said unsaturated radicals, and $R_2$ and $R_3$ are radicals selected from the group consisting of hydrogen, lower alkyl and the unsaturated radicals represented by R and $R_1$.

3. A resinous composition comprising the reaction product at between 200° C. and 300° C. of a rosin-modified alkyd resin, with from 1% to 50% of a monohydric phenolic compound containing from 2 to 4 beta-unsaturated olefinic radicals having from 3 to 4 carbon atoms, said phenolic compound being of the general formula

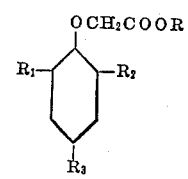

wherein R and $R_1$ represent said unsaturated radicals, $R_2$ and $R_3$ are radicals selected from the group consisting of hydrogen, lower alkyl and the unsaturated radicals represented by R and $R_1$.

4. A resinous composition comprising the reaction product at between 200° and 300° C. of a rosin ester of a polyhydric alcohol with from 1% to 50% of a monohydric phenolic compound containing from 2 to 4 beta-unsaturated olefinic radicals having from 3 to 4 carbon atoms, said phenolic compound being of the general formula

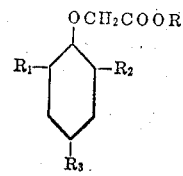

wherein R and $R_1$ represent said unsaturated radicals, $R_2$ and $R_3$ are radicals selected from the group consisting of hydrogen, lower alkyl and the unsaturated radicals represented by R and $R_1$.

5. A resinous composition comprising the reaction product at between 200° and 300° C. of ester gum with from 1% to 50% of the allyl ester of diallylphenoxyacetic acid.

6. The process of making a resinous composition suitable for use in coating compositions, comprising heating at between 200° C. and 300° C. (a) a natural gum component selected from the group consisting of rosin, copal, gum elemi, sandarac, thus, the polyhydric alcohol esters of said natural gums, and alkyd resins modified by said natural gums, with from 1% to 50% of (b) a monohydric phenolic compound containing from 2 to 4 beta-unsaturated olefinic radicals having from 3 to 4 carbon atoms, said phenolic compound being of the general formula

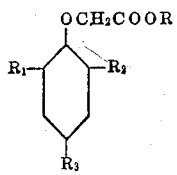

wherein R and $R_1$ represent said unsaturated radicals, $R_2$ and $R_3$ are radicals selected from the group consisting of hydrogen, lower alkyl and the unsaturated radicals represented by R and $R_1$.

7. A resinous composition comprising the reaction product at between 200° and 300° C. of rosin modified alkyd resin with from 1% to 50% of the allyl ester of diallylphenoxyacetic acid.

8. A resinous composition comprising the reaction product at between 200° and 300° C. of ester gum with from 1% to 50% of the allyl ester of allylphenoxyacetic acid.

9. A resinous composition comprising the reaction product at between 200° and 300° C. of rosin modified alkyd resin with from 1% to 50% of the allyl ester of allylphenoxyacetic acid.

10. A resinous composition comprising the reaction product at between 200° and 300° C. of rosin with from 1% to 50% of the allyl ester of diallylphenoxyactetic acid.

JOHN B. RUST.
WILLIAM B. CANFIELD.

REFERENCES CITED

The following references are of record in the file of this patent:

UNITED STATES PATENTS

| Number | Name | Date |
| --- | --- | --- |
| 2,285,797 | Bellefontaine et al. | June 9, 1942 |